(12) United States Patent
Kumashiro

(10) Patent No.: US 6,505,147 B1
(45) Date of Patent: Jan. 7, 2003

(54) METHOD FOR PROCESS SIMULATION

(75) Inventor: Shigetaka Kumashiro, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,395

(22) Filed: May 18, 1999

(30) Foreign Application Priority Data

May 21, 1998 (JP) ............................................ 10-139970

(51) Int. Cl.$^7$ .......................... G06F 17/10; G06F 9/455
(52) U.S. Cl. ............................. 703/2; 703/14; 716/20; 700/121
(58) Field of Search .............................. 703/2, 4, 5, 13, 703/14, 15; 716/20; 700/98, 121

(56) References Cited

U.S. PATENT DOCUMENTS

| | | | | |
|---|---|---|---|---|
| 5,930,494 A | * | 7/1999 | Akiyama | 703/7 |
| 6,080,200 A | * | 6/2000 | Kumashiro | 703/13 |
| 6,099,574 A | * | 8/2000 | Fukuda et al. | 703/14 |
| 6,116,766 A | * | 9/2000 | Maseeh et al. | 700/97 |
| 6,144,929 A | * | 11/2000 | Kumashiro | 703/2 |
| 6,154,717 A | * | 11/2000 | Kumashiro | 703/2 |
| 6,360,190 B1 | * | 3/2002 | Kumashiro | 703/2 |

FOREIGN PATENT DOCUMENTS

| | | |
|---|---|---|
| JP | H10-64834 | 6/1998 |

OTHER PUBLICATIONS

Law, M.E. Grid Adaption Near Moving Boundaries in Two Dimension for IC Process Simulation, IEEE Transactions on Computer–Aided Design of Integrated Circuits and Systems, vol. 14, No. 10, Oct. 1995, pp. 1223–1230.*

Paffrath et al., M. Method of Temporary Coordinate Domains for Moving Boundary Value Problems, IEEE Transactions on Computer–Aided Design of Integrated Circuits and Systems, vol. 12, No. 6, Jun. 1993, pp. 746–756.*

Mattausch et al., H.J. HiSIM: The First Complete Drift–Diffusion MOSFET Model for Circuit Simulation, 6th International Conference on Solid–State and Integrated–Circuit Technology, 2001, pp. 861–866.*

Miyawaki et al., D. Correlation Method of Circuit–Performance and Technology Fluctuations for Improved Design Reliability, Proceedings of the ASP–DAC Design Automation Conference, 2001, pp. 39–44.*

Kosik et al., "On the Interplay Between Meshing and Discretization in Three–Dimensional Diffusion Simulation", IEEE Transactions on Computer–Aided Design of Integrated Circuits and Systems, vol. 19, No. 11, Nov. 2000, pp. 1233–1240.*

Lin et al.,"2–D Mesh Adaption and Flux Discretizations for Dopant Diffusion Modeling", IEEE Transactions on Computer–Aided Design of Integrated Circuits and Systems, vol. 15, No. 2, Feb. 1996, pp. 194–207.*

Ismail et al., "Adaptive Meshing Schemes for Simulating Dopant Diffusion", IEEE Transactions on Computer–Aided Design, vol. 9, No. 3, Mar. 1990, pp. 276–289.*

(List continued on next page.)

*Primary Examiner*—Russell Frejd
(74) *Attorney, Agent, or Firm*—Scully, Scott, Murphy & Presser

(57) ABSTRACT

A method for process simulation capable of simulating a segregation phenomenon of any impurity and a diffusion phenomenon for a system including a substance boundary such as an interface between a silicon layer and an oxide film. According to the method, accuracy of the simulation is maintained without use of a boundary protective layer. A diffusion equation is formulated by dividing a device model of the system into a mesh to form mesh points such that some of mesh points are disposed on the substance boundary, and treating each mesh point on the boundary as a multiple point of quadruplicated or higher. Thereupon, an interval between adjacent points among points constituting the multiple point is assumed to fall within a range of an effective distance of 0.3 nm or less, more preferably 0.1 nm or less, to formulate the diffusion equation.

19 Claims, 3 Drawing Sheets

OTHER PUBLICATIONS

Driga et al., "Coupled Transient Finite Element and Boudary Element Method Modeling of Nonlinear, Nonhomogeneous, Electric Field Devices with Mesh Refinement", Annual Report Conf. on Elec. Insulation and Dielectric Phenomena, vol. 2.*

Kumashiro et al., "A Triangular Mesh Generation Method Suitable for the Analysis of Complex MOS Device Structures", International Workshop on Numerical Modeling of Processes and Devices for Integrated Circuits, pp. 167–170, Jun. 1994.*

Syo et al., "A Triangular Mesh with the Interface Protection Layer Suitable for the Diffusion Simulation", International Conf. on Simulation of Semiconductor Processes and Devices, pp. 173–174, Sep. 1996.*

Shoutoushi, Yukita, "Improving the Precision of Diffusion Simulation Using a Mesh Provided With a Boundary Protection Layer", Shingaku Gihou, vol. 96, No. 258, pp. 31–37 (1996.9).

Kumashiro Shigetaka,, "The Development of a General Diffusion Scheme for a Two–Dimensional Process Simulator", Shingaku Gihou, vol. 97, No. 268,pp. 1–8 (1997.9).

* cited by examiner

METHOD FOR PROCESS SIMULATION

BACKGROUND OF THE INVENTION

1. Field of the Invention

The present invention relates to a method for process simulation in which a fabrication process of a device such as a semiconductor integrated circuit is simulated, and more specifically to a method for process simulation capable of simulating segregation phenomena of any impurities with high accuracy.

2. Description of the Related Art

Process simulation represented by simulation of fabrication of semiconductor devices uses a computer to numerically analyze processes such as an ion implantation process and diffusion process without actual fabrication of the devices, and estimates physical quantities and the shape such as an impurity profile in the devices. Since upon the process simulation for impurity diffusion it is difficult to analytically solve a diffusion equation, it is general to prepare a proper device model, and divide the device model to two-dimensional and three-dimensional meshes to perform discrete numerical calculation of changes in physical quantities at mesh points using a finite element method or the like.

As the shape of the mesh there are frequently used triangles in the case of the two-dimensional simulation and tetrahedrons in the case of the three-dimensional simulation. In these cases, in order to achieve the appropriate process simulation, it is essential for circumcenters of adjacent triangles (tetrahedrons) not to mutually intersect. For this, there may be provided Delaunay partition: there is no vertex of another triangle (tetrahedron) in a circumscribed circle (sphere) of each triangle (tetrahedron) constituting the mesh.

In a device which is an object of the process simulation there is a portion which forms a boundary or interface between two substance regions that make contact with each other. The two substance regions are, for example, a silicon layer and an oxide layer, respectively. Since the boundary is a plane of discontinuity, mere disposition of mesh points on the boundary makes simulation of the diffusion phenomenon difficult. In contrast, the boundary is an area where segregation is liable to occur as an actual physical phenomenon. The boundary is also an area in which accurate simulation is desired for investigating the segregation phenomenon.

Conventionally, one of the following methods is used for improving accuracy of the simulation: (1) a method of treating each mesh point on the boundary as a duplicated point (i.e., double point) (*J. Electrochem. Soc.*, Vol. 126, No. 11, pp. 1939–1945, 1979, or process simulation program "TSUPREM4"), (2) a method of treating each mesh point on the boundary as a duplicated point and disposing a boundary protective layer (Syo, Kumashiro, *SISPAD* '96, PP. 173–174, 1996, or *Singakugiho* (Technical Report of the Institute of Electronics, Information and Communication Engineers), Vol. 96, No. 258, pp.31–37, 1996), and (3) a method of treating each mesh point on the boundary as a triplicated point (i.e., triple point) (*Singakugiho*, Vol. 97., No. 268, pp. 1–8, 1997).

In the following, such conventional methods will be described with reference to FIGS. 1A to 1F. An oxide film 1 and a silicon layer 2 make contact with each other to construct a boundary B or an interface.

In the first case where mesh points on the boundary are treated as duplicated points, as illustrated in FIG. 1A, mesh points 3 are disposed in the oxide film 1 and the silicon layer 2 and on the boundary B therebetween. Upon formulating a diffusion equation, as illustrated in FIG. 1B, each mesh point on the boundary B is treated as a duplicated point, in which one point constituting the duplicated point is disposed inside the oxide film 1 with the other point being disposed inside the silicon layer 2.

In the second case where mesh points on the boundary are treated as duplicated points and the boundary protective layer is disposed, as illustrated in FIG. 1C, the boundary protective layer is set in the vicinity of the boundary B, and in the boundary protective layer the mesh is made dense. Then, the mesh points 3 are disposed in the oxide film 1 and the silicon layer 2 and on the boundary B. Upon formulating a diffusion equation, as illustrated in FIG. 1D, each mesh point 3 on the boundary B is treated as a duplicated point, and one point constituting the duplicated point is disposed inside the oxide film 1 with the other point disposed inside the silicon layer 2.

In the third case where mesh points on the boundary are treated as triplicated points, as illustrated in FIG. 1E, the mesh points 3 are disposed in the oxide film 1 and the silicon layer 2 and on the boundary B. Upon formulating a diffusion equation, as illustrated in FIG. 1F, each mesh point on the boundary B is treated as a triplicated point, and one point constituting the triplicated point is disposed inside the oxide film 1 with other one point disposed inside the silicon layer 2 and with a remaining one point left behind on the boundary as a mesh point 3 of an intermediate layer.

The aforementioned conventional method however suffers from a difficulty that, in the case where the boundary protective layer is not provided, a large control volume possessed by each mesh point on the boundary-causes migration of an impurity dose larger than the actual case together with effect that a transport coefficient of a segregation flux is very large, whereby the accuracy of simulation of a segregation phenomenon is severely deteriorated. In contrast, in the case where the boundary protective layer is provided, there is not yet established a general technique in which for an arbitrary three-dimensional device configuration the boundary protective layer is generated while maintaining Delauney partition in a three-dimensional structure where a plurality of substances are brought into contact, and hence there is not yet established a technique for generating the boundary protective layer without failure.

SUMMARY OF THE INVENTION

An object of the present invention is to provide a method for process simulation capable of simulating diffusion phenomena and impurity segregation phenomena while maintaining the accuracy of simulation without use of the boundary protective layer for a system including a substance boundary such as an interface between a silicon layer and an oxide film.

The above object is achieved by a method for process simulation for simulating a diffusion phenomenon in a system in which a first substance region and a second substance region make contact with each other to form a boundary, comprising the steps of dividing a device model of the system into a mesh to generate mesh points such that some of the mesh points are mesh points disposed also on the boundary; and formulating a diffusion equation by treating each mesh point on the boundary as a multiple point of quadruplicated or higher.

Here, the multiple point is a point in which a plurality of points are assembled. The assembled points are regarded and treated as a single point, that is the multiple point. The multiple point is, for example, a quadruplicated point (i.e., quadruple point), a quintuplicated point (i.e., quintuple point), or a sextuplicated point (i.e., sextuple point). In the case of the quadruplicated point, the diffusion equation may be formulated by distributing two points among four points constituting the quadruplicated points inside the first substance region with the remaining two points distributed inside the second substance region. In the case of the quintuplicated point, the diffusion equation may be formulated by distributing two points among five points constituting the quintuplicated point inside the first substance region with other two points distributed inside the second substance region and further with the remaining one point left behind on the boundary as an intermediate layer. In the case of the sextuplicated point, the diffusion equation may be formulated by distributing three points among six points constituting the sextuplicated point inside the first substance region with the remaining three points distributed inside the second substance region. In either case, upon formulating the diffusion equation a mutual interval of points constituting the multiple point is preferably enough smaller than the typical interval of a mesh, to be concrete a distance between adjacent points is preferably 0.3 nm or less.

In the present invention, as a combination of the first substance region and the second substance region there may be listed a combination of a silicon layer and an oxide film, for example.

In accordance with the present invention, there is no need of consciously forming the boundary protective layer when the mesh is generated, and simulation of a diffusion phenomenon, particularly segregation of any impurity is performed with maintaining predetermined accuracy of simulation. This is because any error caused by occurrence of parasitic thickness due to the multiple point construction can be restricted to a certain level or less by treating mesh points on the substance boundary in the diagrammatical arrangement of the device model as a multiple points of quadruplicated or higher, and setting an effective distance between adjacent points constituting the multiple point to be very short. The present invention is particularly effective in a three-dimensional process simulator where there is not established a technique to form without failure the boundary protective layer for a device of an arbitrary configuration in the present state.

The above and other objects, features and advantages of the-present invention will become apparently from the following description referring to the accompanying drawings which illustrate examples of the preferred embodiments of the present invention.

DESCRIPTION OF THE PREFERRED EMBODIMENTS

When there is simulated a diffusion phenomenon in a system where a first substance region and a second substance region make contact with each other to form a boundary, the system is firstly diagrammatically divided into a mesh to form mesh points by means of an ordinary mesh generation method such that some of mesh points are disposed also on the substance boundary between the first substance region and the second substance region. Here, "diagramatically divided into a mesh" means that a mesh is generated on a device model corresponding to the system.

Then, a diffusion equation is formulated by treating each mesh point on the boundary as a multiple point of a quadruplicated or higher order at which a plurality of points substantially exist at the same position. A simulation result is obtained by numerically solving the diffusion equation using a finite element method and the like.

Figure 1A:
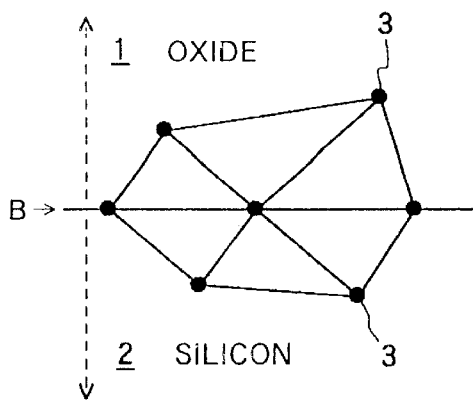
FIGS. 1A and 1B are views illustrating diagrammatical mesh arrangement and mesh arrangement upon formulation of a diffusion equation, respectively, when a duplicated point is disposed on the substance boundary in a conventional method of process simulation.
Figure 1B:
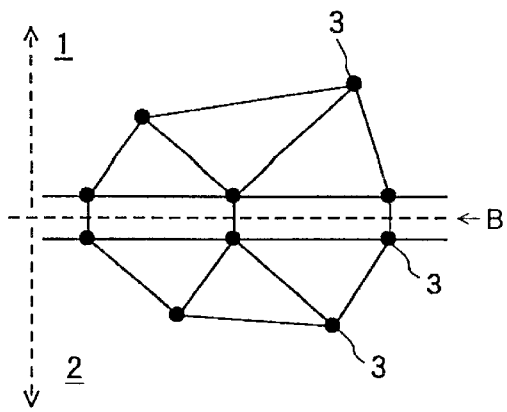
Figure 1C:
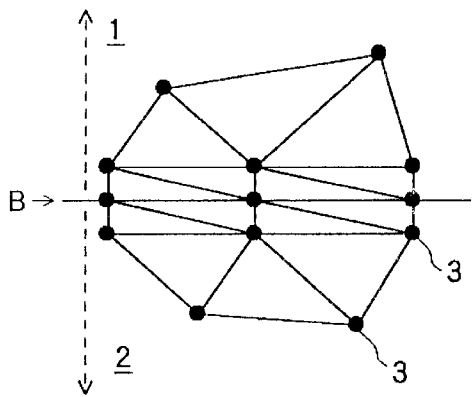
FIGS. 1C and 1D are views illustrating diagrammatical mesh arrangement and mesh arrangement upon formulating a diffusion equation, respectively, when a duplicated point is disposed on the substance boundary and a boundary protective layer are used in a conventional method of process simulation.
Figure 1D:
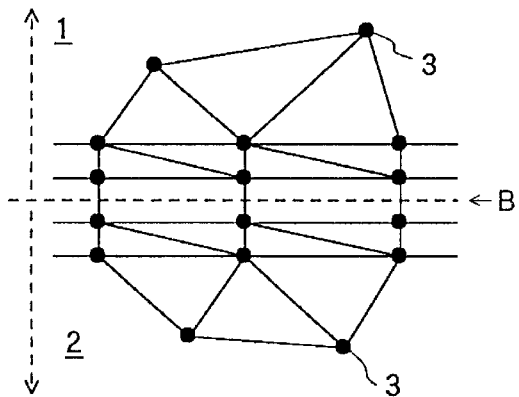
Figure 1E:
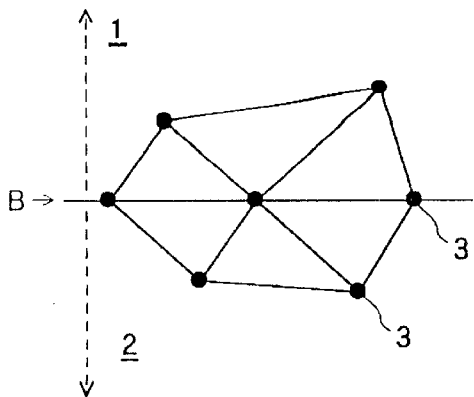
FIGS. 1E and 1F are views illustrating diagrammatical mesh arrangement and mesh arrangement upon formulating a diffusion equation, respectively, when a triplicated point is disposed on the substance boundary in the conventional method of process simulation.
Figure 1F:
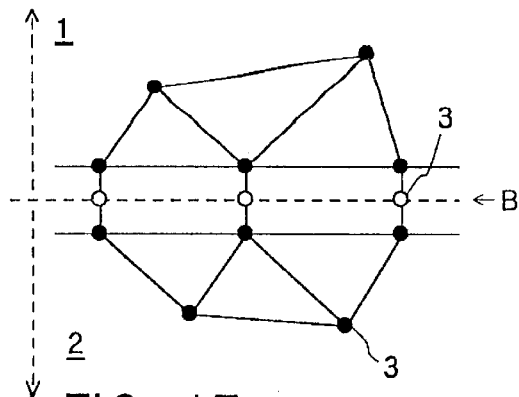
Figure 2A:
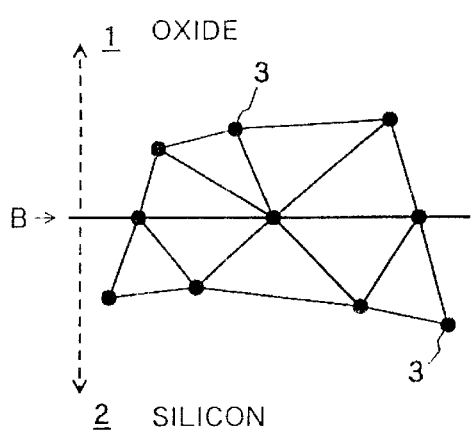
FIG. 2A is a view illustrating diagrammatical mesh arrangement in a method of process simulation according to a preferred embodiment of the present invention.
Figure 2B:
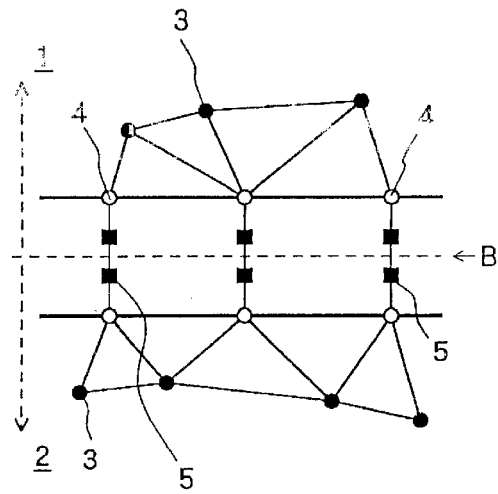
FIGS. 2B, 2C, and 2D are views illustrating mesh arrangement upon formulating diffusion equations when each mesh point on a substance boundary is treated as a quadruplicated point, a quintuplicated point, and a sextuplicated point, respectively, in the method of process simulation according to the preferred embodiment of the present invention.
Figure 2C:
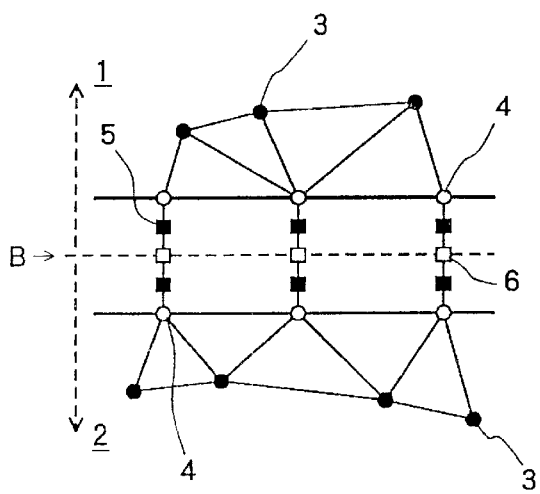
Figure 2D:
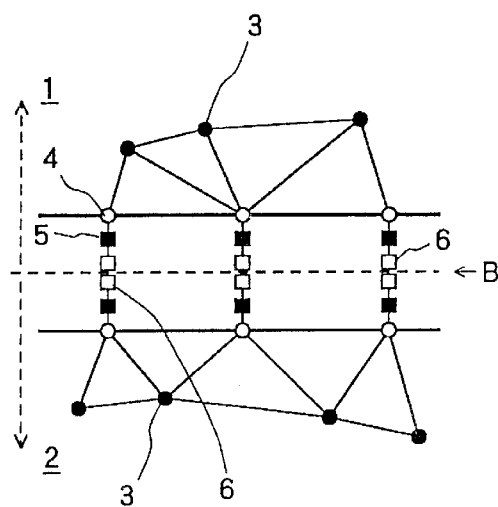

As a preliminary process to numerically solve the diffusion equation there are performed a first process where a mesh is diagrammatically arranged including on the substance boundary, and a second process to formulate the diffusion equation by treating mesh points disposed on the boundary with the first process as multiple points of quadruplicated or higher. Of course, the actual system is modeled into a device model for simulation before the generation of the mesh. FIG. 2A illustrates diagrammatical mesh arrangement with the first process. Each of FIGS. 2B to 2D illustrates mesh arrangement upon formulating the diffusion equation in the second process. The following description is made for a system in which the oxide film 1 and the silicon layer 2 make contact with each other to form the substance boundary. As the multiple point, there are treated a quadruplicated point (FIG. 2B), a quintuplicated point (FIG. 2C), and sextuplicated point (FIG. 2D).

In the following, there will be described the method for process simulation according to the preferred embodiment of the present invention, separately for the first and second processes.

In the first process, as illustrated in FIG. 2A, an ordinary mesh generation method is used to dispose the mesh points-3 inside the oxide film 1 and the silicon layer 2 and further dispose the mesh points 3 on the boundary B.

After the execution of the first process, the second process is executed, which formulates the diffusion equation by treating the mesh points 3 disposed on the boundary in the first process as multiple points of quadruplicated or higher.

In the case where the multiple point is a quadruplicated point, as illustrated in FIG. 2B, two points among four points constituting the quadruplicated point are disposed inside the oxide film 1 with remaining two points disposed inside the silicon layer 2. Thereupon, one point between the two points disposed inside the oxide film 1 is adapted to be mesh points 4 on a pseudo-boundary protective layer of the boundary between the oxide film and the silicon layer, and a remaining one point is adapted to be mesh points 5 corresponding to a substance interface between the oxide film and the silicon layer. The mesh points corresponding to the substance interface are treated as actual boundary points where upon numerically calculating the diffusion equation a segregation flux is defined between the silicon layer and the oxide film. In the same manner, one point disposed inside the silicon layer 2 is adapted to be the mesh point 4 on the pseudo-boundary protective layer, and a remaining one point to be the mesh point 5 corresponding to the substance interface between the oxide film and the silicon layer.

In the case where the multiple point is a quintuplicated point, as illustrated in FIG. 2C, two points among five points constituting the quintuplicated point is distributed inside the oxide film 1 with other two points distributed inside the silicon layer 2 and further with remaining one point left behind on the boundary as an intermediate layer.

Also in the case of the quintuplicated point, in the same manner as the case of quadruplicated point, one point between the two points disposed inside the oxide film 1 is adapted to become the mesh point 4 in the pseudo-boundary protective layer and the other one point adapted to become the mesh point 5 corresponding to the substance interface, and one point between two points disposed inside the silicon layer 2 is adapted to become the mesh point 4 in the pseudo-boundary protective layer and the other one point adapted to become the mesh point 5 corresponding to the substance interface. The mesh points left behind on the boundary are the mesh points 6 corresponding to the intermediate layer, and are used for demonstrating piling-up of impurities.

In the case where the multiple point is a sextuplicated point, as illustrated in FIG. 2D, three points among six points constituting the sextuplicated point are disposed inside the oxide film 1 with remaining three points disposed inside the silicon layer 2. Herein, the three points disposed inside the oxide film 1 are the mesh point 4 in the pseudo-boundary protective layer, the mesh point 5 corresponding to the substance interface, and the mesh point 6 corresponding to the intermediate layer. In the same manner, the three points disposed inside the silicon layer 2 are also the mesh point 4 in the pseudo-boundary protective layer, the mesh point 5 corresponding to the material interface, and the mesh point 6 corresponding to the intermediate layer, respectively.

In the present embodiment, as described above, the mesh points 3 disposed on the substance boundary in the diagrammatical arrangement are treated as the multiple points of quadruplicated or higher upon formulating the diffusion equation. Thereupon, an interval between adjacent points is set to be preferably 0.3 nm or less for example, more preferably 0.1 nm or less such that the respective points constituting the multiple point are substantially at the same point, i.e., at the mesh point position in the diagrammatical mesh arrangement.

Each mesh point 3 on the substance boundary in the diagrammatical mesh arrangement is divided as the multiple point to the mesh point 4 in the pseudo-boundary protective layer and the mesh point 5 corresponding to the substance interface, and furthermore in the cases of the quintuplicated and sextuplicated points the mesh point 3 is divided also to the mesh point 6 corresponding to the intermediate layer. In these cases, it is preferable to dispose the mesh point 6 (if any) corresponding to the intermediate layer, the mesh point 5 corresponding to the substance interface, and the mesh point 4 in the pseudo-boundary protective layer in this order substantially on a straight line toward opposite sides of the substance boundary position in the diagrammatical mesh arrangement taking the substance boundary position (broken line in the figures) as the center.

After the second process is executed as described above to determine mesh arrangement upon formulating the diffusion equation, the diffusion equation may be numerically calculated using the determined mesh arrangement. Since points constituting the multiple point have different features such as the mesh points 4 in the pseudo-boundary protective layer, the mesh points 5 corresponding to the substance interface, and the mesh points 6 corresponding to the intermediate layer, as described above, also upon numerically calculating the diffusion equation treatments corresponding to the features are performed.

Figure 3:
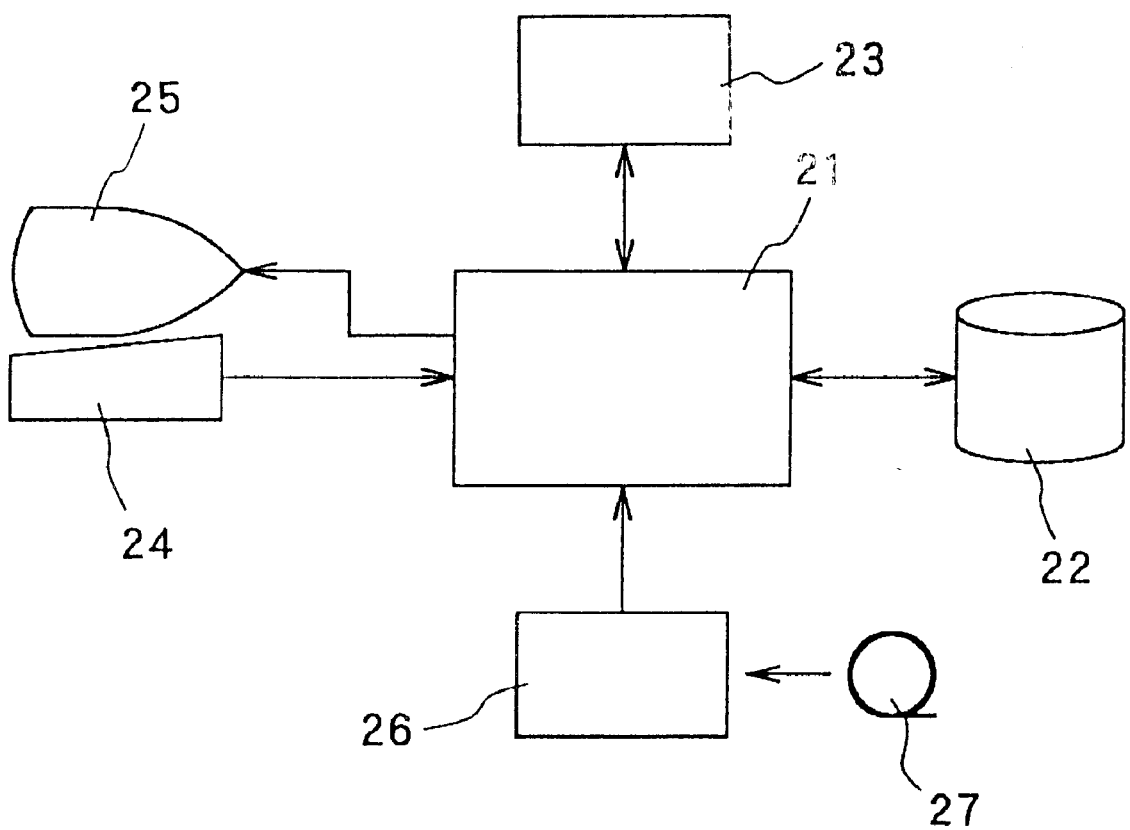
FIG. 3 is a circuit block diagram illustrating the construction of a computer system for performing process simulation based upon the present invention.

The method for process simulation described above is executed by a computer system such as a supercomputer and an engineering work station (EWS) using a computer program for execution of the method. A program for the process simulation is read into a computer system through a recording medium such as a magnetic tape and a CD-ROM. FIG. 3 is a block diagram illustrating the construction of the computer system for executing the process simulation.

The computer system includes a central processing unit (CPU) 21, a hard disk drive 22 for storing programs and data, a main memory 23, an input apparatus 24 such as a keyboard and a mouse, a display 25 such as a CRT (cathode-ray tube), a reading apparatus 26 for reading a recording medium 27 such as a magnetic tape and a CD-ROM. The Hard disk drive 22, main memory 23, input apparatus 24, display 25, reading apparatus 26 are connected with the CPU 21. In the computer system, a recording medium 27 in which programs for process simulation are stored is mounted on the reading apparatus 26, and the program is read and stored in the hard disk drive 22. The program stored in the hard disk drive 22 is loaded on main memory 23 with the CPU 21 for execution of the process simulation.

It is to be understood that variations and modifications of the method for process simulation disclosed herein will be evident to those skilled in the art. It is intended that all such modifications and variations be included within the scope of the appended claims.

What is claimed is:

1. A method for process simulation for the fabrication of semiconductor devices, by simulating a diffusion phenomenon in a system in which a first substance region and a second substance region make contact with each other to form a boundary, comprising the steps of:

modeling an actual system into a device model;

dividing said device model of the system into a mesh to form mesh points such that some of the mesh points are disposed mesh points also on the boundary;

formulating a diffusion equation by treating each mesh point on the boundary as a multiple point of quadruplicate, quintuplicate or sextuplicate;

numerically solving the diffusion equation to perform the process simulation for the fabrication of semiconductor devices; and outputting a simulation result.

2. A method according to claim 1 wherein the first substance region is a silicon layer, and the second substance region is an oxide film.

3. The method according to claim 1, further comprising treating each mesh point on the boundary as a quadruplicated point, wherein two of the four points constituting the quadruplicated point are adapted as part of a pseudo-boundary protective layer between the boundary and each substance region, and the other two of the four points constituting the quadruplicated point correspond to the interface and are treated as actual boundary points.

4. The method according to claim 1, further comprising treating each mesh point on the boundary as a quintuplicated point, wherein two of the five points constituting the quintuplicated point are adapted as part of a pseudo-boundary protective layer between the boundary and each substance region, another two of the five points constituting the quintuplicated point correspond to the interface and are treated as actual boundary points, and a fifth point constituting the quintuplicated point corresponds to the interface layer and is adapted to demonstrate the piling up of impurities.

5. The method according to claim 1, further comprising treating each mesh point on the boundary as a sextuplicated point, wherein two of the six points constituting the sextuplicated point are adapted as part of a pseudo-boundary protective layer between the boundary and each substance region, another two of the six points constituting the sextuplicated point correspond to the interface and are treated as actual boundary points, and another two points constituting the sextuplicated point corresponds to the interface layer.

6. A method for process simulation for the fabrication of semiconductor devices, by simulating a diffusion phenomenon in a system in which a first substance region and a second substance region make contact with each other to form a boundary, comprising the steps of:

modeling an actual system into a device model;

dividing said device model of the system into a mesh to form mesh points such that some of the mesh points are disposed mesh points also on the boundary;

formulating a diffusion equation by treating each mesh point on the boundary as a quadruplicated point, and distributing two points among four points constituting the quadruplicated point inside the first substance region and distributing remaining two points inside the second substance region;

numerically solving the diffusion equation to perform the process simulation for the fabrication of semiconductor devices; and outputting a simulation result.

7. A method according to claim 6 wherein an interval between adjacent points of four points constituting the quadruplicated point is assumed to fall within a range of an effective distance of 0.3 nm or less each other to formulate the diffusion equation.

8. At method according to claim 6 wherein the first substance region is a silicon layer, and the second substance region is an oxide film.

9. A method for process simulation for the fabrication of semiconductor devices, by simulating a diffusion phenomenon in a system in which a first substance region and a second substance region make contact with each other to form a boundary, comprising the steps of:

modeling an actual system into a device model;

dividing said device model of the system into a mesh to form mesh points such that some of the mesh points are disposed mesh points also on the boundary;

formulating a diffusion equation by treating each mesh point on the boundary as a quintuplicated point, distributing two points among five points constituting the quintuplicated point inside the first substance region with two other points distributed inside the second substance region and further with a remaining one point disposed as an intermediate layer to formulate the diffusion equation;

numerically solving the diffusion equation to perform the process simulation for the fabrication of semiconductor devices; and outputting a simulation result.

10. A method according to claim 9 wherein an interval between adjacent points of five points constituting the quintuplicated point is assumed to fall within a range of an effective distance of 0.3 nm or less to formulate the diffusion equation.

11. A method according to claim 9 wherein the first substance region is a silicon layer, and the second substance region is an oxide film.

12. A method for process simulation for the fabrication of semiconductor devices, by simulating a diffusion phenomenon in a system in which a first substance region and a second substance region make contact with each other to form a boundary, comprising the steps of:

modeling an actual system into a device model;

dividing said device model of the system into a mesh to generate mesh points such that some of the mesh points are disposed mesh points also on the boundary;

formulating a diffusion equation by treating each mesh point as a sextuplicated point, and distributing three points among six points constituting the sextuplicated point inside the first substance region with three remaining points distributed inside the second substance region;

numerically solving the diffusion equation to perform the process simulation for the fabrication of semiconductor devices; and outputting a simulation result.

13. A method according to claim 12 wherein an interval between adjacent points among six points constituting the sextuplicated point is assumed to fall within an effective distance of 0.3 nm or less to formulate the diffusion equation.

14. A method according to claim 12 wherein the first substance region is a silicon layer, and the second substance region is an oxide film.

15. A recording medium readable with a computer for storing a program to realize functions of:

modeling a system into a device model, the system including a boundary on which a first substance region and a second substance region make contact with each other;

dividing the device model into a mesh to generate mesh points such that some of mesh points are disposed on the boundary;

treating each mesh point on the boundary as a multiple point of quadruplicate, quintuplicate, or sextuplicate to formulate a diffusion equation;

numerically solving the diffusion equation to perform the process simulation for the fabrication of semiconductor devices; and outputting a simulation result.

16. The recording medium of claim 15, said program further realizing the function of treating each mesh point on the boundary as a quadruplicated point, and distributing two points among four points constituting the quadruplicated point inside the first substance region and distributing two remaining points inside the second substance region.

17. The recording medium of claim 15, said program further realizing the function of treating each mesh point on the boundary as a quintuplicated point, distributing two points among five points constituting the quintruplicated point inside the first substance region with other two points distributed inside the second substance region and further with a remaining one point disposed as an intermediate layer to formulate the diffusion equation.

18. The recording medium of claim 15, said program further realizing the function of treating each mesh point on the boundary as a sextuplicated point, and distributing three points among six points constituting the sextuplicated point inside the first substance region with three remaining points distributed inside the second substance region.

19. A method for process simulation for the fabrication of semiconductor devices, by simulating a diffusion phenomenon in a system in which a first substance region and a second substance region make contact with each other to form a boundary, comprising the steps of:

modeling an actual system into a device model;

dividing said device model of the system into a mesh to three dimensional mesh to form mesh points such that some of the mesh points are disposed mesh points also on the boundary;

formulating a diffusion equation by treating each mesh point on the boundary as a multiple point of quadruplicate, quintuplicate or sextuplicate;

numerically solving the diffusion equation to perform the process simulation for the fabrication of semiconductor devices; and outputting a simulation result.

* * * * *